(12) United States Patent
Krzywinski et al.

(10) Patent No.: US 11,043,902 B2
(45) Date of Patent: Jun. 22, 2021

(54) BIDIRECTIONAL DC DC CONVERTER INTERFACE TO A DC AC INVERTER AND ENERGY STORAGE

(71) Applicants: Eugene F. Krzywinski, San Jose, CA (US); William B. Reed, San Jose, CA (US); James A. Allen, Jr., Gilroy, CA (US)

(72) Inventors: Eugene F. Krzywinski, San Jose, CA (US); William B. Reed, San Jose, CA (US); James A. Allen, Jr., Gilroy, CA (US)

( * ) Notice: Subject to any disclaimer, the term of this patent is extended or adjusted under 35 U.S.C. 154(b) by 0 days.

(21) Appl. No.: 16/751,765

(22) Filed: Jan. 24, 2020

(65) Prior Publication Data

US 2020/0195159 A1    Jun. 18, 2020

Related U.S. Application Data

(63) Continuation-in-part of application No. 16/297,619, filed on Mar. 9, 2019, now abandoned.

(60) Provisional application No. 62/641,197, filed on Mar. 9, 2018.

(51) Int. Cl.
*H02M 3/335* (2006.01)
*H02J 7/00* (2006.01)
*H02J 3/38* (2006.01)

(52) U.S. Cl.
CPC ......... *H02M 3/33584* (2013.01); *H02J 3/381* (2013.01); *H02J 7/0068* (2013.01); *H02J 2300/26* (2020.01)

(58) Field of Classification Search
CPC ............. H02M 3/33584; H02M 3/3376; H02J 7/0068; H02J 2300/26
See application file for complete search history.

(56) References Cited

U.S. PATENT DOCUMENTS

| 6,545,883 B2 * | 4/2003 | Xing ................. H02M 3/33592 363/21.11 |
| 9,667,157 B1 | 5/2017 | Dong et al. |
| 2003/0086282 A1 * | 5/2003 | Zeng ................. H02M 3/33592 363/95 |
| 2011/0149607 A1 * | 6/2011 | Jungreis .............. H02M 3/3376 363/21.02 |
| 2015/0036390 A1 * | 2/2015 | Ou .................... H02M 3/33592 363/17 |
| 2015/0229225 A1 | 8/2015 | Jang et al. |
| 2015/0249395 A1 * | 9/2015 | Xiong .................. H02M 3/337 363/21.06 |

(Continued)

*Primary Examiner* — Kyle J Moody
*Assistant Examiner* — Lakaisha Jackson
(74) *Attorney, Agent, or Firm* — Michael B. Einschlag

(57) ABSTRACT

A bidirectional DC DC converter that transfers power among an energy source (for example, a solar PV array), an energy storage system, and an energy usage system (for example, a DC AC inverter). The converter controls the charge and discharge times of the energy storage system so that power harvested during daylight can be metered to the DC AC inverter at predetermined times. During charge times, the converter utilizes synchronous rectification when down-converting higher voltages to lower voltages and during discharge times the converter utilizes variable overlapping of switch drive signals to provide a continuous range of voltage levels of transferred power from the energy storage system to the DC AC inverter.

9 Claims, 7 Drawing Sheets

(56) References Cited

U.S. PATENT DOCUMENTS

2017/0005565 A1    1/2017  Bai et al.
2018/0048240 A1    2/2018  Hayasaki et al.

* cited by examiner

BIDIRECTIONAL DC DC CONVERTER INTERFACE TO A DC AC INVERTER AND ENERGY STORAGE This patent application is a continuation-in-part of a U.S. patent application entitled "Bidirectional DC DC Converter for Renewable Energy Storage" having application Ser. No. 16/297,619 which was filed on Mar. 9, 2019, which U.S. patent application claimed priority under 35 U.S.C. 119(e) from a U.S. provisional patent application having Appl. No. 62/641,197 which was filed on Mar. 9, 2018, all of which prior patent applications are incorporated herein by reference in their entireties.

One or more embodiments relate to bidirectional DC DC converters that operate between sources, loads and energy storage devices.

BACKGROUND

Solar power in the US is primarily tied to a grid to enable a solar system owner to avail him/herself of net metering provisions offered by a local utility. In many instances, net metering provisions are undergoing changes which decrease net metering credits to the solar system owner by changing on-peak hours (i.e., hours when net metering credits are of highest value) to other times (i.e., when a power feed from the owner's solar system to the utility grid is more valuable to the utility). Since solar power available from the solar system depends on the sun's profile, not time, maximum solar energy harvest is now out of sync with utility demand.

To mitigate this, a solar system can be equipped with an energy storage system, such as a battery, that stores energy harvested at peak solar production and releases energy to the grid or to a solar system owner, during the new on-peak hours, thereby benefiting both the utility grid and the solar system owner. However, solar systems deployed over the past several years were provisioned primarily for net metering, and storage was not contemplated. As such, retrofitting such solar systems with storage or with additional power inputs is a difficult, engineering intensive and costly task. In addition, and in practice, variance in solar system output voltages can range from tens to hundreds of volts, thereby inhibiting the direct use of fixed voltage batteries as storage.

Current state of the art technology for adding energy storage to an existing solar photovoltaic (PV) installation includes replacing a current inverter with an inverter configured to connect to a battery system, or to include an inverter within each battery pack. In addition, during times when an AC utility power line is shut down, the inverter must not export AC power back onto the utility power line for reasons of utility worker safety. To continue to provide on-site, consumed power without energizing the AC utility line, either dedicated load circuits or transfer switches must be used to switch the inverter from the AC utility line to internal on-site lines.

In addition to the above, batteries present a fixed (or limited range of) voltage which makes adding their DC voltage to a PV system DC voltage bus impractical because of the wide variability of PV system voltage. Further, since solar systems may have different PV configurations, a one-size fits all solution has not been realizable.

The market growth of energy storage systems for renewable energy applications continues to grow greatly, although primarily for new installations.

SUMMARY

One or more embodiments provide solutions to one or more of the above-identified issues, for example, in installing new solar energy systems and in retrofitting existing solar energy systems with energy storage. In particular, one or more such embodiments provide an electrical adapter for a renewable energy system (for example, and without limitation, a solar energy system) that is positioned electrically between renewable energy sources and loads such that energy storage elements can be added to the system with minimal effort and disruption. In addition, one or more such embodiments reduce the cost and effort required to retrofit renewable energy systems with energy storage, and reduce the engineering required to effect such change.

In accordance with one or more examples, an embodiment is inserted into an existing solar energy system that comprises a photovoltaic (PV) array connected to a grid-tied inverter where it is desired to add an energy storage system to the solar energy system. Such an energy storage system has a duality in that it is both a load (i.e., when charging) and a source (i.e., when discharging) and, to function advantageously, the energy storage system ought to match the electrical characteristics of the solar energy system. Typically, existing grid-tied solar energy systems have high DC voltage magnitudes that are incompatible with low DC voltage magnitudes of readily available energy storage systems. As such, a voltage converter is required to adapt the energy storage system to the solar energy system. PV arrays typically operate in conjunction with maximum power point tracking (MPPT) elements to ensure maximum power harvesting from the PV arrays. This MPPT function is typically provided by a load (in most cases this is provided by a grid-tied inverter). In accordance with one or more embodiments, during a charge mode of the energy storage system, the existing load (which typically provides the MPPT function) remains operational as designed, and the embodiment routes a configurable amount of energy from the PV array to the energy storage system (for example, a battery to be charged). During a discharge phase of the energy storage system, the embodiment matches the input characteristics of the load so that, to the load, the energy storage system emulates a PV source, thereby enabling optimum blending of energy storage system energy and maximum power PV energy to be presented to the load.

In accordance with one or more embodiments: (a) an MPPT function; (b) a voltage conversion function; and (c) an intelligent transfer function are combined with intelligent electronics for control of operations, either preprogrammed or user adjustable. In accordance with one or more such embodiments, a charge control function for an energy storage system, such as a battery, is provided which interfaces to an energy storage system management system. In addition, in accordance with one or more further embodiments, operational data is collected and transmitted to a display system such as a smart phone, or an internet-based collection system that provides such data to a solar system owner or operator. In further addition, in accordance with one or more further such embodiments, additional energy can be provided from an AC power source (such as, for example and without limitation, AC generating equipment). In still further addition, in accordance with one or more still further embodiments, a secondary off-grid inverter can be connected to the energy storage system to provide power to dedicated, critical loads when a primary, grid-tied inverter is off-line.

DETAILED DESCRIPTION

Figure 1:
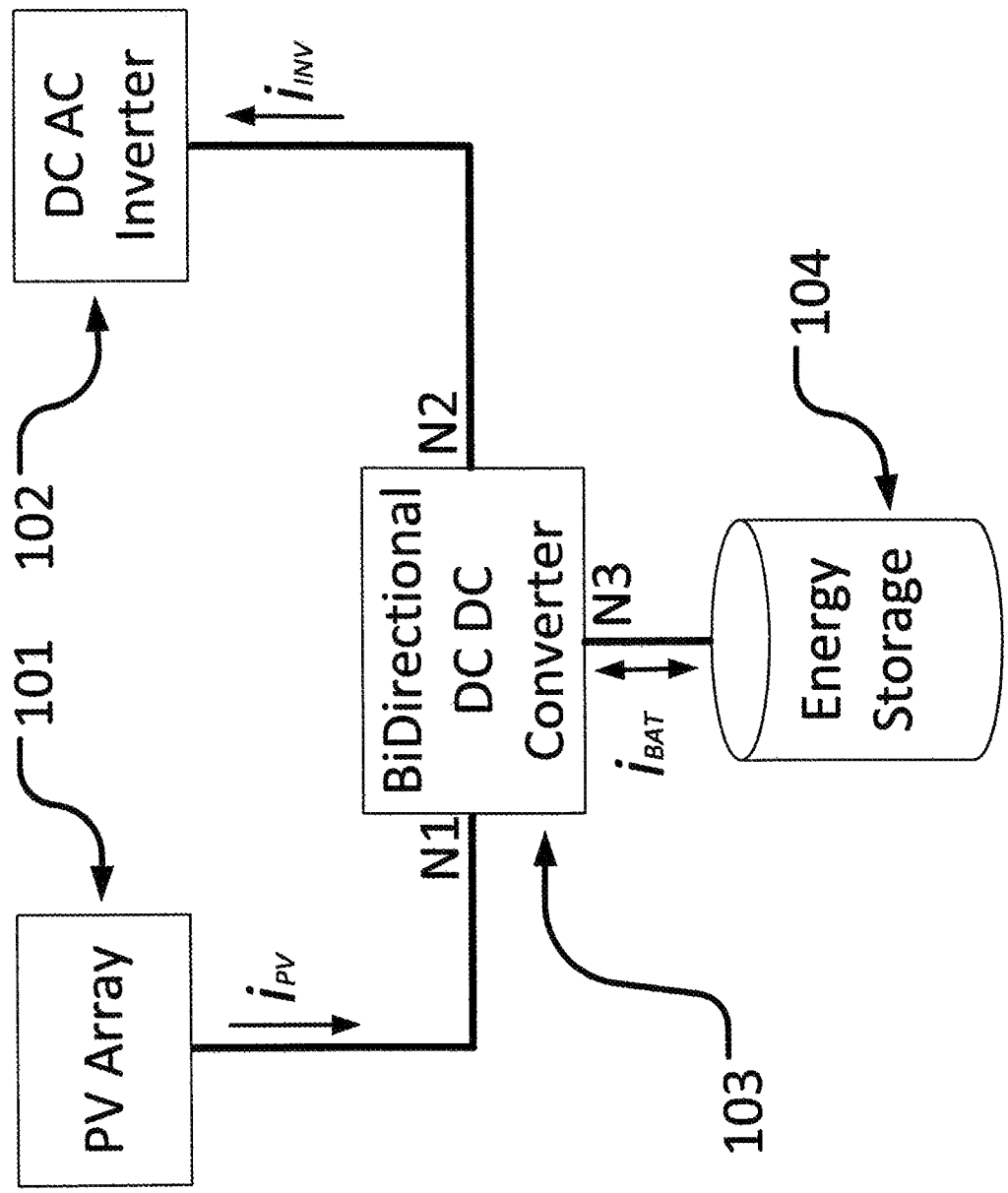
FIG. 1 is a block diagram showing an installation configuration of an embodiment with respect to a photovoltaic (PV) array of a solar energy system, an energy storage system, and a grid-tied DC AC inverter.
Figure 2:
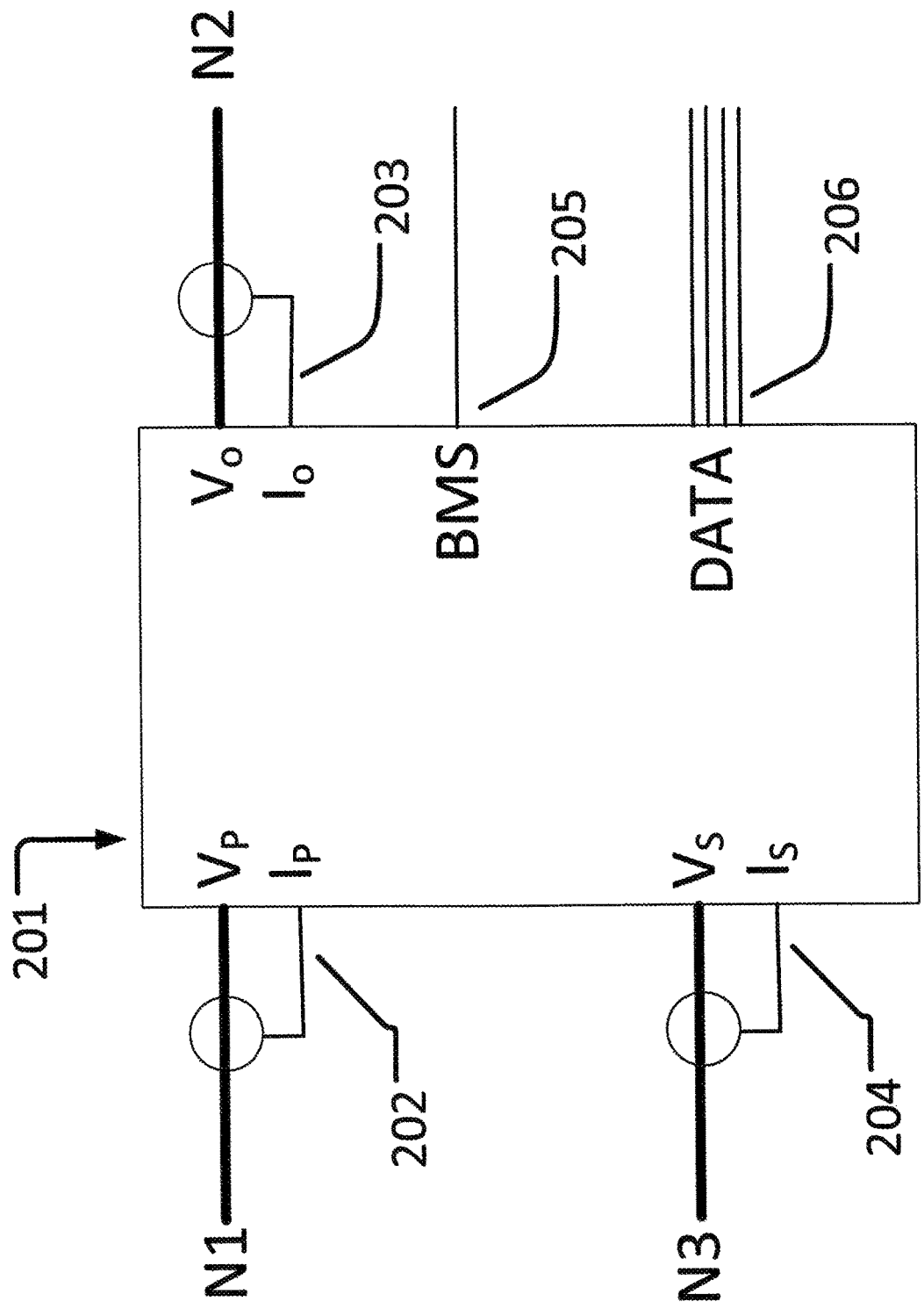
FIG. 2 is a functional diagram of a controller that forms a part of one or more embodiments, including the embodiment shown in FIG. 1.

FIG. 1 is a block diagram showing an installation configuration of an embodiment (i.e., bidirectional DC DC converter 103, also referred to below as DC DC converter 103) with respect to a power source (for example and without limitation, photovoltaic (PV) array (PV array 101) of a solar energy system, an energy storage system (energy storage system 104), and an energy usage system (for example, for example and without limitation, a grid-tied DC AC inverter (DC AC inverter 102)). FIG. 2 is a functional diagram of controller 201 which forms a part of DC DC converter 103. As shown in FIG. 1, DC DC converter 103 (which is fabricated in accordance with one or more embodiments) is positioned (electrically) between an energy source (in this case, PV array 101 of a solar energy system), grid-tied DC AC inverter 102, and energy storage system 104. PV array 101 outputs power (as a product of voltage and current) which is applied as input to terminal N1 (referred to as terminal 202 in FIG. 2) of DC DC converter 103. As also shown in FIG. 1, DC DC converter 103 outputs power from terminal N2 (referred to as terminal 203 in FIG. 2) to grid-tied DC AC inverter 102. As further shown in FIG. 1, DC DC converter 103 outputs power from terminal N3 (referred to as terminal 204 in FIG. 2) to energy storage system 104 (for example and without limitation, a battery, a battery pack, or a battery system), and receives power input to terminal N3 (referred to as terminal 204 in FIG. 2) from energy storage system 104. DC DC converter 103 includes a controller (referred to as controller 201 in FIG. 2).

In accordance with one or more embodiments, controller 201 may be embodied as a controller that executes one or more algorithms. Any of a number of commercially available controllers such as, for example and without limitation, a controller available from Microchip Technology Inc. having corporate headquarters at 2355 West Chandler Blvd., Chandler, Ariz., USA 85224-6199, are suitable for use in fabricating DC DC converter 103. As indicated in FIG. 2, in accordance with one or more embodiments: (a) current and voltage input to terminal N1 (terminal 202 in FIG. 2) are measured (for example, and without limitation, using a current sensor and a voltage sensor available from LEM USA Inc. of Milwaukee, Wis.), and these current and voltage measurements are applied as input to controller 201; (b) current and voltage output from terminal N2 (terminal 203 in FIG. 2) are measured (for example, and without limitation, using a current sensor and a voltage sensor available from LEM USA Inc. of Milwaukee, Wis.), and these current and voltage measurements are applied as input to controller 201; (c) current and voltage input from terminal N3 (terminal 204 in FIG. 2) are measured (for example, and without limitation using a current sensor and a voltage sensor available from LEM USA Inc. of Milwaukee, Wis.), and these current and voltage measurements are applied as input to controller 201; (d) when energy storage system 104 is embodied as a battery or a battery system, controller 201 of DC DC converter 103 uses signal port 205 to communicate with (and receive information from) a battery management system (BMS) embedded in energy storage system 104; and (e) controller 201 uses data lines 206 to send operational data (data such as, for example and without limitation, the amount of power transmitted from PV array 101 to DC AC inverter 102 as a function of time, the amount of power transmitted from PV array 101 to energy storage system 104 as a function of time, the amount of power transmitted from energy storage system 104 to DC AC inverter 102 as a function of time, the amount of power transmitted to DC AC inverter 102 as a function of time, voltage and current at terminal 202 as a function of time, voltage and current at terminal 203 as a function of time, the voltage and current at terminal 203 as a function of time, and averages of the aforementioned amounts over time periods such as, for example and without limitation, hours, days and weeks) for display at user devices (for example and without limitation, a computer system or a mobile telephone) and to receive input from users such as business rules via data lines 206. The term user herein refers to any one of a number of entities such as, for example and without limitation a renewable energy operator and/or owner. In accordance with one or more embodiments, such above-mentioned user communications may entail the use of internet connections in accordance with any one of a number of methods that are well known to those of ordinary skill in the art.

As will be explained below, controller 201 operates in response to business rules that may be supplied to controller 201: (a) as configuration parameters; (b) by user input over data lines 206; or (c) as a combination of configuration parameters and user input. Such business rules specify, for example and without limitation: (a) a Power Ratio to Charge (i.e., a fraction of power output from PV array 101 to be diverted by DC AC inverter 102 to energy storage system 104); (b) a Power Ratio to Discharge (i.e., a fraction of power from energy storage system 104 to be sent to DC AC inverter 102); (c) a parameter indicating how much power DC AC inverter 102 can accept; (d) a parameter indicating the maximum power energy storage system 104 can accept; (e) Time of Day rules that specify when power output by PV array 101 is to be applied as input to charge energy storage system 104; and (f) Time of Day rules to specify when power is to be discharged from energy storage system 104 and applied as input to DC AC inverter 103. Use of these business rules, in accordance with one or more embodiments, enable a user to time shift the use or sale of energy output from PV array 101 to advantageous times.

During daylight, when PV array 101 is energized (i.e., it is harvesting energy), its maximum power point (MPP) typically varies; depending on the amount of solar irradiance, temperature, PV array mismatch due to shading and soiling of the PV array, as well as, orientation differences between PV panels. When PV array 101 is producing power, DC AC inverter 102 uses an MPPT algorithm to extract the maximum solar power. MPPT algorithms typically accomplish this result by matching the impedance of DC AC inverter 102 to the impedance of PV array 101. Since the impedance of PV array 101 depends, for example, on the amount of solar irradiance, DC AC inverter 102 typically adjusts its impedance throughout the solar day.

In accordance with one or more embodiments, an impedance matching algorithm operates to divert any desired portion of the available power from PV array 101 into energy storage system 104.

As will be described in below, DC DC converter 103 automatically follows the voltage and current at terminal N1 (terminal 202 in FIG. 2) and terminal N2 (terminal 203 in FIG. 2) to match the impedance established by the MPPT algorithm of DC AC inverter 102 so that: (a) maximum energy harvesting from PV array 101 is undisturbed; and (b) DC DC converter 103 is transparent to PV array 101 and DC AC inverter 102. In accordance with one or more embodiments, DC DC converter 103 diverts a desired portion of power output from PV array 101 to charge fixed voltage energy storage system 104. In accordance with one or more such embodiments, the desired portion of power to be diverted is set in accordance with business rules discussed above.

Impedance is calculated by the well-known formula of Voltage/Current and power is calculated as the product of Voltage and Current. Controller 201 of DC DC converter 203 monitors the currents and voltages at terminals N1, N2, and N3 calculates the impedance and the amount of power presented at terminals N1, N2 and N3.

If, for example, it is desired to divert 90% of the available solar power output from PV array 101 into energy storage system 104, with the remaining 10% being allowed to flow into DC AC inverter 102, the impedance of DC DC converter 103 is adjusted (as will described below) until the measured power at terminals N1 and N2 achieves the desired result. Conversely, if the desired ratio is 10% to energy storage system 104 and 90% into DC AC inverter 102, the impedance of DC DC converter 103 will be increased relative to the setting used when capturing 90% of the solar power into energy storage system 104.

In accordance with one or more embodiments, in operation, when DC AC inverter 102 adjusts its impedance in an attempt to harvest more solar power, DC DC converter 103 will adjust its impedance to keep the desired ratio of power flowing to energy storage system 104. For example, if DC AC inverter 102 makes an impedance adjustment resulting in a higher than desired ratio of power flowing into DC AC inverter 102, then DC DC converter 103 will reduce its impedance such that the desired ratio is maintained. This process continues throughout the solar day as the solar irradiance changes. In addition, if the total power available from PV array 101 is greater than the power allowed by energy storage system 104, DC DC converter 103 will increase its impedance to protect energy storage system 104 from overload. In this case, the amount of power going into DC AC inverter 102 from PV array 101 will increase.

Figure 6A:
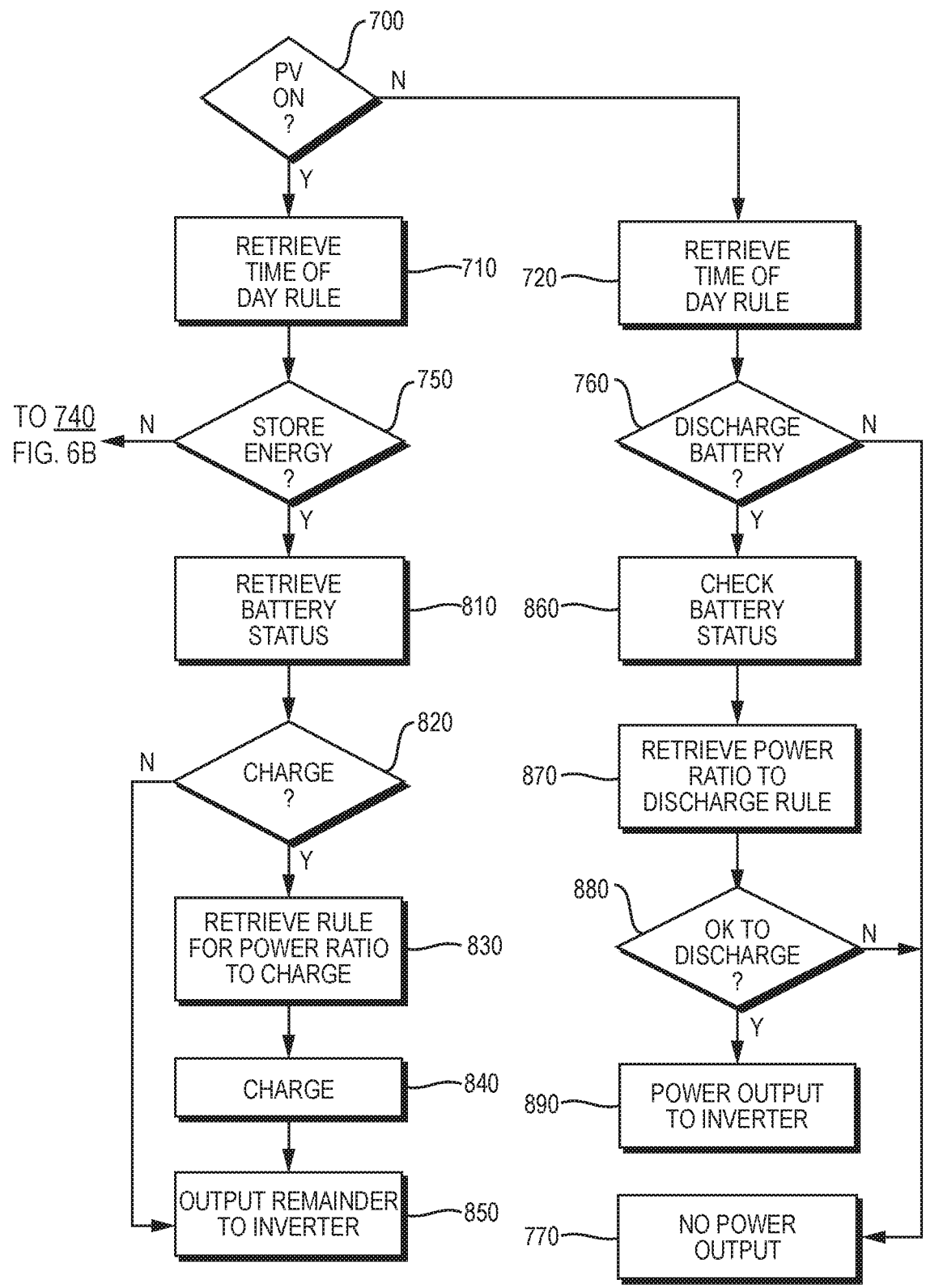
FIGS. 6A and 6B are a flowchart showing operations of DC DC converter 103 in conjunction with business rules.
Figure 6B:
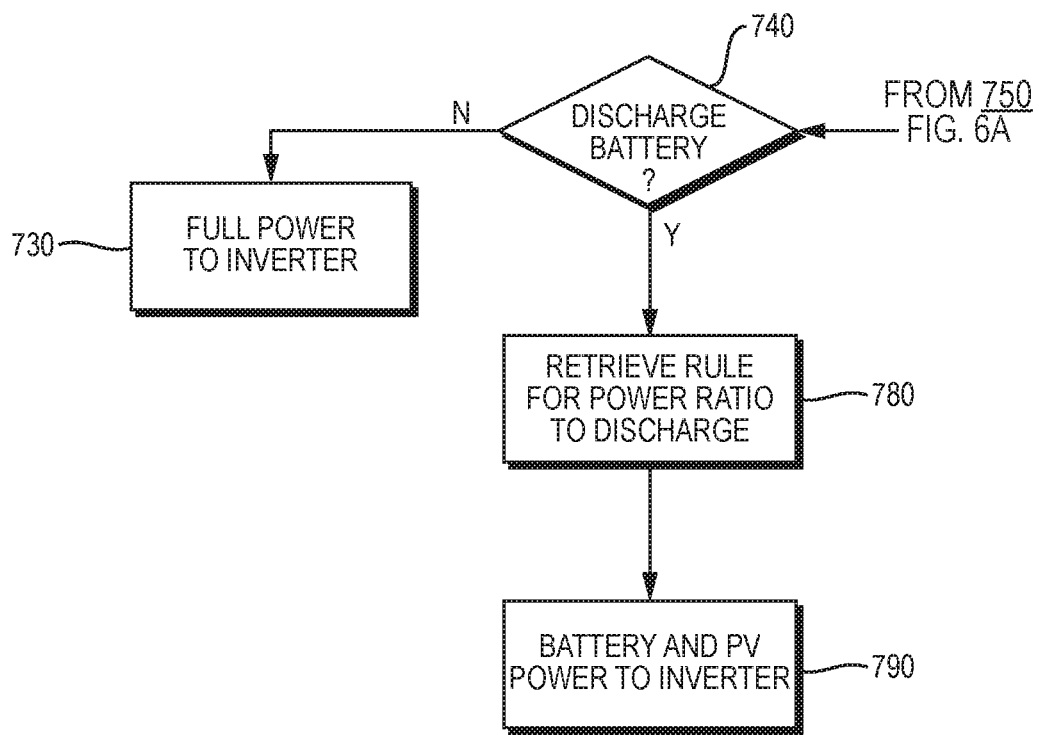

In accordance with one or more embodiments, the operating parameters and their execution are governed by a combination of electronic control circuitry and business rules established, for example, by a user. A flowchart showing operations of DC DC converter 103 in conjunction with business rules is shown in FIGS. 6A and 6B. The flowchart parameters can be modified according to user requirements or those of a utility to which the solar system may be attached.

At decision box 700 in FIG. 6A, controller 201 determines whether PV array 101 is on, i.e., generating power, by determining, for example and without limitation, whether $i_{array}*v_{array}$ is other than 0. If yes, control is transferred to box 710, otherwise control is transferred to box 720.

At box 710 in FIG. 6A, PV array 101 is on and controller 201 retrieves a "Time of Day" business rule, for example and without limitation, in the form of one or more time periods that are to be used to store energy, i.e., to charge energy storage system 104 (referred to here as a battery), or to discharge the battery. Then, control is transferred to decision box 750.

At decision box 750 in FIG. 6A, controller 201 determines whether to store energy based on whether the time at which the query is made falls within one of the time periods for storing energy. If yes, control is transferred to box 810, otherwise control is transferred to decision box 740.

At box 810 in FIG. 6A, in accordance with one or more embodiments, controller 201 retrieves data from a Battery Management System (BMS) of energy storage system 104 using signal port 205 to determine the State of Charge (SOC), the State of Health (SOH), the charge rate and the discharge rate defined by a user or by a battery manufacturer. In this respect, as described below, DC DC converter 103 acts as a charge controller by measuring voltage and current at terminal N3 (terminal 204 in FIG. 2) and using business rules to monitor charge and discharge operations. Advantageously, this means that many battery chemistry charge/discharge profiles can be used to provide energy storage system 104; thereby making DC DC converter 103 agnostic to battery technologies and chemistries such as, for example and without limitation, Lithium Ion, Lead Acid, liquid flow batteries or rechargeable fuel cell batteries. Then, control is transferred to decision box 820.

At decision box 820 in FIG. 6A, controller 201 determines whether the battery status indicates whether the battery can be charged. If yes, control is transferred to box 830, otherwise, control is transferred to box 850.

At box 830 in FIG. 6A, controller 201 retrieves a "Power Ratio to Charge" business rule to determine the power limit to apply to the battery versus the power input from PV array 101. Then, control is transferred to box 840.

At box 840 in FIG. 6A, controller 201 causes power to be transferred to the battery (i.e., the battery is charged). Controller 201 monitors the amount of power transferred so that the battery stores a first predetermined amount of power (for example, the first predetermined amount is set by a business rule) which first predetermined amount is typically less than the maximum power the battery can store by a second predetermined amount (for example, the second predetermined amount is set by a business rule). Then, control is transferred to box 850.

At box 850 in FIG. 6A, controller 201 causes the remainder of power output from PV array 101 to be transferred to DC AC inverter 102.

At decision box 740 in FIG. 6B, controller 201 determines whether to transfer energy stored in the battery to DC AC inverter 102 based on whether the time at which the query is made falls within one of the time periods for energy discharge. If yes, control is transferred to box 780, otherwise control is transferred to box 730.

At box 730 in FIG. 6B, controller 201 causes the full power output from PV array 101 to be applied as input to DC AC inverter 102.

At box 780 in FIG. 6B, controller 201 retrieves a "Power Ratio to Discharge" business rule which sets forth the maximum power DC AC inverter 102 can accept. Then, control is transferred to box 790.

At box 790 in FIG. 6B, controller 201 causes power from PV array 101 and energy storage system 104 to be blended and applied as input to DC AC inverter 102.

At box 720 in FIG. 6A, controller 201 retrieves a "Time of Day" business rule in the form of one or more time periods for discharging the battery. Then, control is transferred to decision box 760.

At decision box 760 in FIG. 6A, controller 201 determines whether to transfer energy from energy storage system 104 to DC AC inverter 102 (for example, by discharging the battery) based on whether the time at which the query is made falls within one of the time periods for discharging the battery. If yes, control is transferred to box 860, otherwise control is transferred to decision box 770.

At box 770 in FIG. 6A, no power is output from energy storage system 104, i.e., the battery is not discharged.

At box 860 in FIG. 6A, controller 201 checks the status of the battery by communicating with the BMS using signal port 205. Then, control is transferred to box 870.

At box 870 in FIG. 6A, controller 201 retrieves a "Power Ratio to Discharge" business rule. Then, control is transferred to box 880.

At decision box 880A, controller 201 determines whether the battery is available to discharge energy. If yes, control is transferred to box 890, otherwise, control is transferred to box 770.

At box 890 in FIG. 6A, controller 201 causes power to be transferred to DC AC inverter 102. Controller 201 monitors the amount of power transferred so that power stored in the battery is not lower than a predetermined level (for example, the predetermined level is set by a business rule).

Many of the operational functions of DC DC converter 103 are provided by controller 201 to adjust the amounts of power transferred (a) from PV array 101 to DC AC inverter 102; (b) from PV array 101 to energy storage system 104 (referred to as a charge mode); and (c) from energy storage system 104 to DC AC inverter 102 (referred to as a discharge mode). As will be described below, when DC DC converter 103 operates in a discharge mode (i.e., when power from energy storage device 104 is transferred to DC AC inverter 102), controller 201: (a) monitors voltage and current at terminal N1 (terminal 202 in FIG. 2) and terminal N2 (terminal 203 in FIG. 2), and (b) executes a discharge operation to match the MPP voltage of PV array 101 and DC AC inverter 102. As such, the timing of power discharge from energy storage system 104, the amount of power discharged from energy storage system 104, and the rate of power discharge from energy storage system 104 are governed by controller 201.

Figure 3:
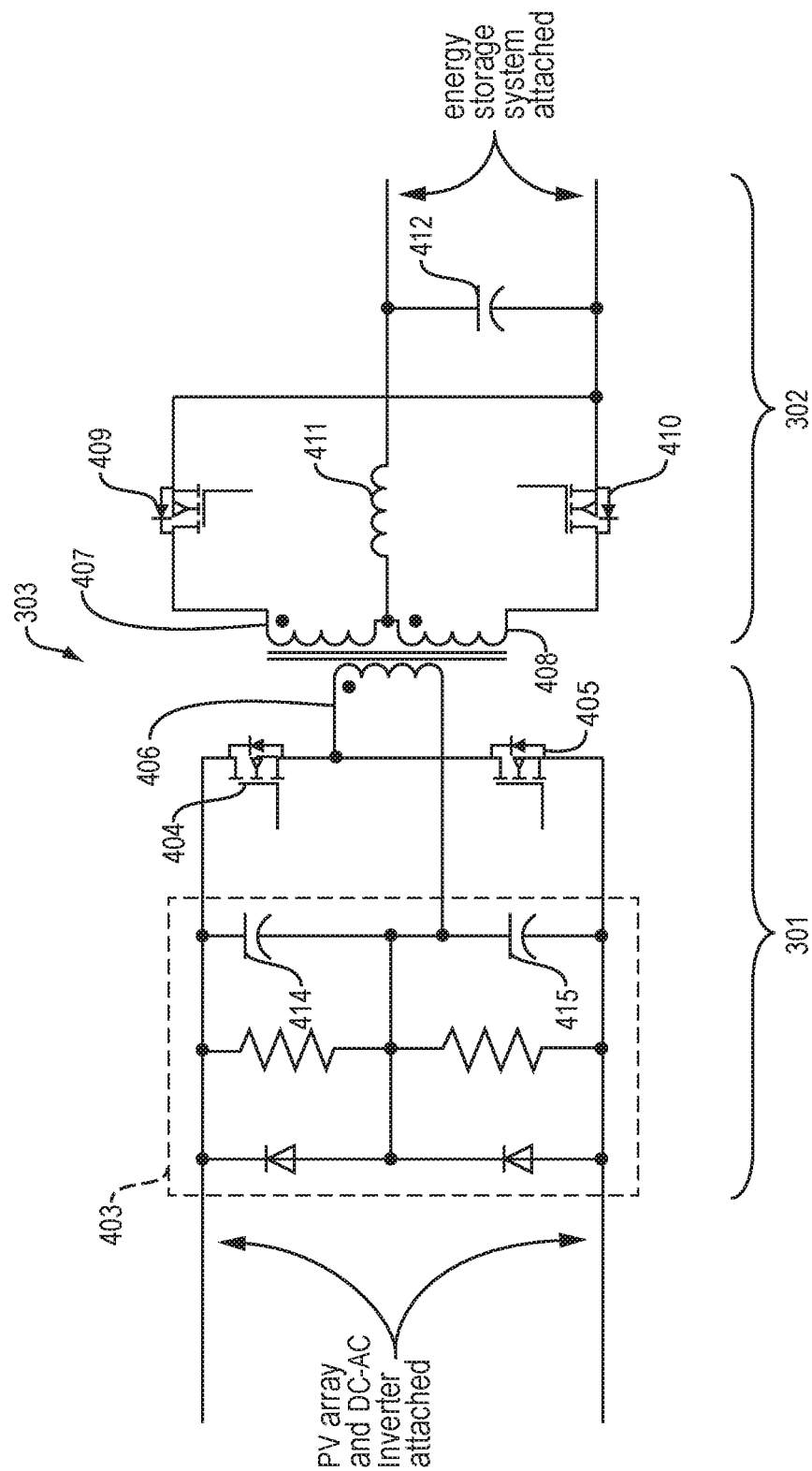
FIG. 3 is a schematic diagram of an embodiment of a Bi DC DC converter forming a part of one or more embodiments.

As will be described below, certain electrical properties which make DC DC converter 103 functional reside in bidirectional DC DC converter 310 (also referred to as Bi DC DC converter 310) shown in FIG. 3. In accordance with one or more embodiments, and as shown in FIG. 3, Bi DC DC converter 310 comprises two sections: primary section 301 (which is referred to as a high voltage side) and secondary section 302 (which is referred to as a low voltage side). As shown in FIG. 3, primary section 301 and secondary section 302 are magnetically coupled by transformer 303. As also shown in FIG. 3, primary section 301 comprises a half bridge switching network. In accordance with one or more embodiments, as shown in FIG. 3, primary section 301 connects to: (a) terminal N1 (terminal 202 in FIG. 2); (b) terminal N2 (terminal 203 in FIG. 2); and (c) the primary terminals of transformer 303. As further shown in FIG. 3, secondary section 302 is magnetically coupled via transformer 303 to primary section 301 and to terminal N3 (terminal 204 in FIG. 2).

In accordance with one or more embodiments, Bi DC DC converter 310 operates bidirectionally as follows. In a charge mode, power output from PV array 101 is applied as input to primary section 301 of Bi DC DC converter 310 (i.e., the high voltage side) and is transmitted to secondary section 302 of Bi DC DC converter 310 (i.e., the low voltage side) through transformer 303. Primary section 301 and transformer 303 down-convert the voltage input to primary section 301 to a lower voltage which is suitable for application to energy storage system 104. In a discharge mode, power output from energy storage system 104 is applied as input to secondary section 302 (i.e., the low voltage side) of Bi DC DC converter 310 and transformer 303 and primary section 301 up-convert the input voltage to secondary section 302 to a higher voltage that matches the voltage at terminal N1 (terminal 202 in FIG. 2) and terminal N2 (terminal 203 in FIG. 2).

The following describes the operation of Bi DC DC converter 310 in more detail. In the charge mode, higher voltage power from PV array 101 is applied as input to Bi DC DC converter 310 at terminal 202 and power flows through Bi DC DC converter 310 to energy storage system 104 at terminal 204. Network 403 in FIG. 3 is a voltage divider that presents ½ of the voltage input to terminal 202 onto primary winding 406 of transformer 303. In accordance with one or more such embodiments, in response to signals received from controller 201, switches 404 and 405 are operated 180 degrees out of phase to each other to generate an AC signal across the terminals of primary winding 406 of transformer 303. Next, in response to signals received from controller 201, secondary windings 407 and 408 of transformer 303 are alternately discharged by operating switches 409 and 410 180 degrees out of phase to each other. In accordance with one or more such embodiments, in response to signals received from controller 201, synchronous rectification in secondary section 302 is provided by synchronous switching of switches 409 and 410 to improve power conversion efficiency. Such synchronous rectification is achieved, in response to signals received from controller 201, by simultaneously closing switch 404 and switch 410 for a time period, then opening switch 404 and switch 410 and simultaneously closing switch 405 and switch 409 during a different time period. Increasing the length of the time period that the switches are closed increases the amount of power transmitted from input terminal 202 to output terminal 204. In accordance with one or more embodiments, controller 201 controls the opening and closing of the switches based upon how much power is desired to be stored. Another way of putting this is that, in the charge mode, the impedance of Bi DC DC converter 310 is adjusted by varying the ratio of conduction time relative to the off time (known as the duty cycle) of switches 404, 405, 409 and 410. Specifically, (a) as controller 201 causes the conduction time to be increased, the impedance of Bi DC DC converter 310 is reduced; and (b) as controller 201 causes the conduction time to be reduced, the impedance is increased. If the switches are all turned off, the impedance of Bi DC DC converter 310 will be very large, i.e., effectively infinite; meaning that no power is diverted into energy storage system 104 (for example, the battery).

In addition, in the charge mode, inductor 411 and capacitor 412 operate to filter the signals from secondary windings 407 and 408 to remove ripple caused by opening and closing the switches. This presents a stable voltage to energy storage system 104 connected to terminal 204.

In accordance with one or more embodiments, controller 201 monitors the voltage and current at terminal N3 (terminal 204 in FIG. 2) to make sure that the power transferred to the battery (i.e., energy storage system 104) does not exceed a predetermined limit. Appropriate values are set by business rules.

A ratio of high voltage to low voltage for Bi DC DC converter 310 is determined by a typical voltage range of a PV array vs. a typical voltage of readily available energy storage systems. For example, a typical voltage of a PV array is in a range from about 200V to about 500V, and a typical voltage of readily available energy storage systems (for example, batteries) is in a range of a few volts about 48V. As such, this gives a high voltage to low voltage ratio in a range from about 4:1 to about 10:1. This voltage ratio determines the turn ratio of transformer 303. As such, transformer 303 would have a turn ratio in a range from about 1.2 to about 2.5 for (turns of coil 406):(turns of coils 407 and 408). Another way of putting this is that the turns to voltage ratio of transformer 303 is determined so that the high voltage section and the low voltage section of Bi DC DC converter 310 are within the impedance matching capability of controller 201. If the ratio is too far off, controller 201 cannot match the desired impedance, and thus cannot provide optimal power transfer. In accordance with one or more embodiments, switches 404, 405, 409 and 410 may include high speed silicon carbide (SiC) or gallium nitride (GaN) transistor devices such as MOSFET devices.

In the discharge mode, low voltage power from energy storage system 104 is applied as input to Bi DC DC converter 310 at terminal 204, and power flows through Bi DC DC converter 310 to DC AC inverter 102 at terminal 203. In accordance with one or more such embodiments, in the discharge mode, secondary section 302 is operated as a DC DC boost converter by charging and discharging inductor 411 (in response to signals from controller 201) using switches 409 and 410 to produce an AC voltage signal having an amplitude which is approximately half the value desired at the output of primary section 301. The AC voltage signals on secondary windings 407 and 408 of transformer 303 are magnetically coupled to primary winding 406 of transformer 303. In the discharge mode, controller 201 causes switches 404 and 405 of section 301 to be turned off so they act as diodes (i.e., through the body diodes of the switches). As a result, the combination of the diodes from switches 404 and 405, and capacitors 414 and 415 in network 403 acts as a voltage doubler to produce a desired high voltage. When the magnetic field in primary winding 406 of transformer 303 forces current through switch 405 into the phase dot terminal of primary winding 406, current flows out of the other terminal of primary winding 406 and into capacitor 415 (capacitor 415 is connected to switch 405). This charges capacitor 415 to some voltage V. When the magnetic field in primary winding 406 of transformer 303 reverses, current flows out of the phase dot terminal of primary winding 406, through switch 404 and into capacitor 414 (capacitor 414 is connected to switch 404. This charges capacitor 414 to the same voltage V. Since voltage V is now present on both capacitors, the sum of both voltages is 2×V. Network 403 also contains a resistor divider to keep the voltage on primary winding 406 at ½ of the input voltage when DC DC converter 103 is not operating.

In accordance with one or more embodiments, controller 201 monitors voltage and current at terminal N3 (terminal 204 in FIG. 2) to make sure that power extracted from the battery (i.e., energy storage system 104) does not exceed a predetermined limit. Appropriate values are set by business rules.

An additional way of understanding the operation of DC DC converter 103 is to consider several states of operation in conjunction with PV array 101 and DC AC inverter 102.

A first state exists when PV array 101 is off (i.e., controller 201 determines that it is not outputting any power) and battery discharge is not allowed by a business rule or controller 201 determines that DC AC inverter 102 is off (i.e., controller 201 determines that the voltage and current input thereto are zero). In this first state, controller 201 causes switches 404, 405, 409 and 410 of Bi DC DC converter 310 to be open. As a result, the impedance of Bi DC DC converter 310 approaches infinity, and as a consequence, no power will be transferred.

A second state exists when PV array 101 is on (i.e., controller 201 determines that it is outputting power) and all of its power output is to be transferred to DC AC inverter 102. In this second state, controller 201 causes switches 404, 405, 409 and 410 of Bi DC DC converter 310 to be in the off position (i.e., open). As a result, the impedance of Bi DC DC converter 310 will be infinite, and the full output from PV array 101 will be applied directly to DC AC inverter 102.

A third state exists when PV array 101 is off (i.e., controller 201 determines that it is not outputting any power) and battery discharge is desired (i.e., power is to be transferred from energy storage system 104 to DC AC inverter 102).

There is a constraint on the operation of DC DC converter 103 that is due to the following. If the voltage at terminal N1 (terminal 202 in FIG. 2) becomes too high, PV array 101 will begin to conduct, i.e., current will flow into PV array 101. In accordance with one or more embodiments, to prevent current backflow from terminal N1 (terminal 202 in FIG. 2) into PV array 101, controller 201 monitors the voltage and current at terminal N1 (terminal 202 in FIG. 2) (for example and without limitation, using a current sensor and a voltage sensor). If controller 201 determines that the current flowing out of terminal N1 (terminal 202 in FIG. 2) into PV array 101 is greater than a small, but a first predetermined, amount (for example, and without limitation, greater than 1% of the sum of the current at terminal N1 (terminal 202 in FIG. 2) and at terminal N2 (terminal 203 in FIG. 2)), controller 201 causes the impedance of Bi DC DC converter 310 to increase by a second predetermined amount. This reduces the current flowing into PV array 101. Conversely, if controller 201 determines that the current flowing out of terminal N1 (terminal 202 in FIG. 2) is much less than the first predetermined amount, controller 201 causes the impedance of Bi DC DC converter 310 to decrease by a third predetermined amount. This increases the current flowing into terminal N2 (terminal 203 in FIG. 2). These predetermined amounts may be set as preconfigured operating parameters or they may be determined using user input received by controller 201 via data terminal 206. In this manner, controller 201 prevents significant energy from flowing into PV array 101 while, at the same time, providing DC AC inverter 102 with an emulation of an MPP voltage.

As DC AC inverter 102 adjusts its impedance to find the MPPT, DC DC converter 103 responds as follows. If DC AC inverter 102 increases its impedance, the voltage on terminals N1 and N2 will increase. If controller 201 determines that this increase in voltage results in more than the allowed current flowing into PV array 101 (see above), controller 201 responds by causing the impedance of Bi DC DC converter 310 to increase. This lowers the voltage at terminals N1 and N2, and thereby, reduces current flow into PV array 101. Conversely, when DC AC inverter 102 decreases its impedance, the voltage on terminals N1 and N2 will decrease. This decrease in voltage will reduce the current flowing into PV array 101. If controller 201 detects that the current has decreased, controller 201 responds by causing the impedance of Bi DC DC converter 310 to decrease. This increases the current flow into PV array 101 back to a desired level (for example, back to the 1% level that was predetermined to be the control point, see above).

Thus, by increasing or decreasing its impedance, DC DC converter 103 behaves just as a solar panel would behave, and as a result, DC AC inverter 102 MPPT works properly.

There is another constraint on the operation of DC DC converter 103 which is operative during battery discharge. Battery output current and battery output power must not be greater than those allowed by battery specifications (these data may be set by business rules or may be obtained from a BMS). If controller 201 determines that either the current output or the power output is too great, controller 201 causes the impedance of Bi DC DC converter 310 to lower the power output. In response, DC AC inverter 102 will then begin an MPPT search to find the new maximum power transfer point. The system then behaves as described above.

Figure 4:
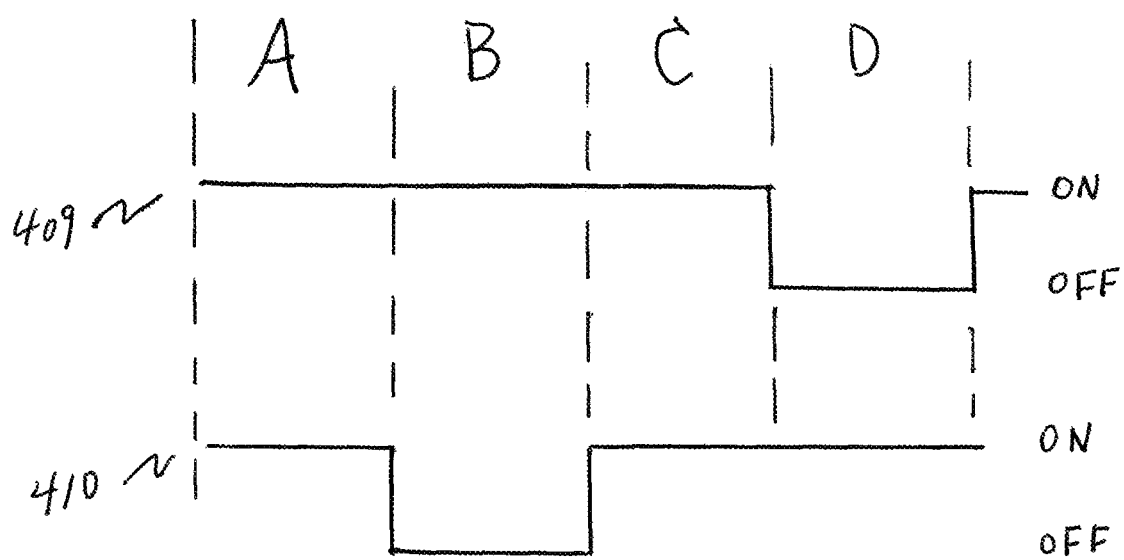
FIG. 4 shows a timing diagram illustrating four (4) states involved in adjusting the impedance of an embodiment during a discharge mode of an energy storage system such as a battery.

Adjusting the impedance of DC DC converter 103 during the battery discharge mode is more complex than during the battery charge mode. FIG. 4 shows a timing diagram illustrating four (4) states (referred to as A, B, C, and D) involved in adjusting the impedance of DC DC converter 103 during the battery discharge mode. FIG. 4 shows waveforms 504 and 505 of drive signals applied by controller 201 to switches 409 and 410 of Bi DC DC converter 310, respectively, during the discharge mode. The states repeat, meaning that, after state D, state A begins again at all times when discharge power is desired.

In state A, controller 201 causes switches 409 and 410 to close (i.e., they conduct). As a result, current flows from energy storage system 104 at terminal 413, through inductor 411, and into both secondary windings 407 and 408 of transformer 303. Because current is flowing into both secondary windings 407 and 408 (the phase dots indicate that the magnetic fields in secondary windings 407 and 408 are of opposite polarity), this results in cancellation of magnetic field in transformer 303. Such a magnetic field cancellation creates a virtual short circuit in secondary windings 407 and 408. The virtual short causes current to flow from the energy storage system 104, through inductor 411, then through switches 409 and 410 to ground. The current flowing through inductor 411 results in a magnetic field building up within inductor 411. The longer switches 409 and 410 are closed, the more magnetic field is stored in inductor 411. At the end of state A, state B is entered where controller 201 causes switch 410 to open while switch 409 remains closed. This removes the current in transformer winding 408 and, as a result, the cancelling magnetic field is removed (this removes the virtual short circuit). During state B, magnetic energy stored in inductor 411 causes current to flow through transformer winding 407, into switch 409 and to ground. The current flowing in transformer winding 407 creates a magnetic field that is coupled to transformer winding 406 and out through the body diode of switch 404. At the end of state B, state C is entered where controller 201 causes both switches 409 and 410 to close. This results in a virtual short circuit that charges up inductor 411 as occurred in state A. At the end of state C, state D is entered where controller 201 causes switch 409 to open while switch 410 remains closed. This removes the current in transformer winding 408 and, as a result, the cancelling magnetic field is removed (this removes the virtual short circuit). During state D, magnetic energy stored in inductor 411 causes current to flow through transformer winding 408, into switch 410 and to ground. The current flowing in transformer winding 408 creates a magnetic field (of the opposite magnetic polarity) that is coupled to transformer winding 406 (the opposite magnetic polarity results in opposite current direction flow in primary winding 406) and out through the body diode of switch 405.

In order to increase or decrease impedance, the duration of state A and state C is changed. As states A and C increase in duration, the impedance of DC DC converter 103 decreases, which allows more power transfer (i.e., power output to DC AC inverter 102 at terminal 402 is increased). As state A and C decrease in duration, the impedance of DC DC converter 103 increases, which reduces the power flow (i.e., power output to DC AC inverter 102 at terminal 402 is decreased).

Figure 5:
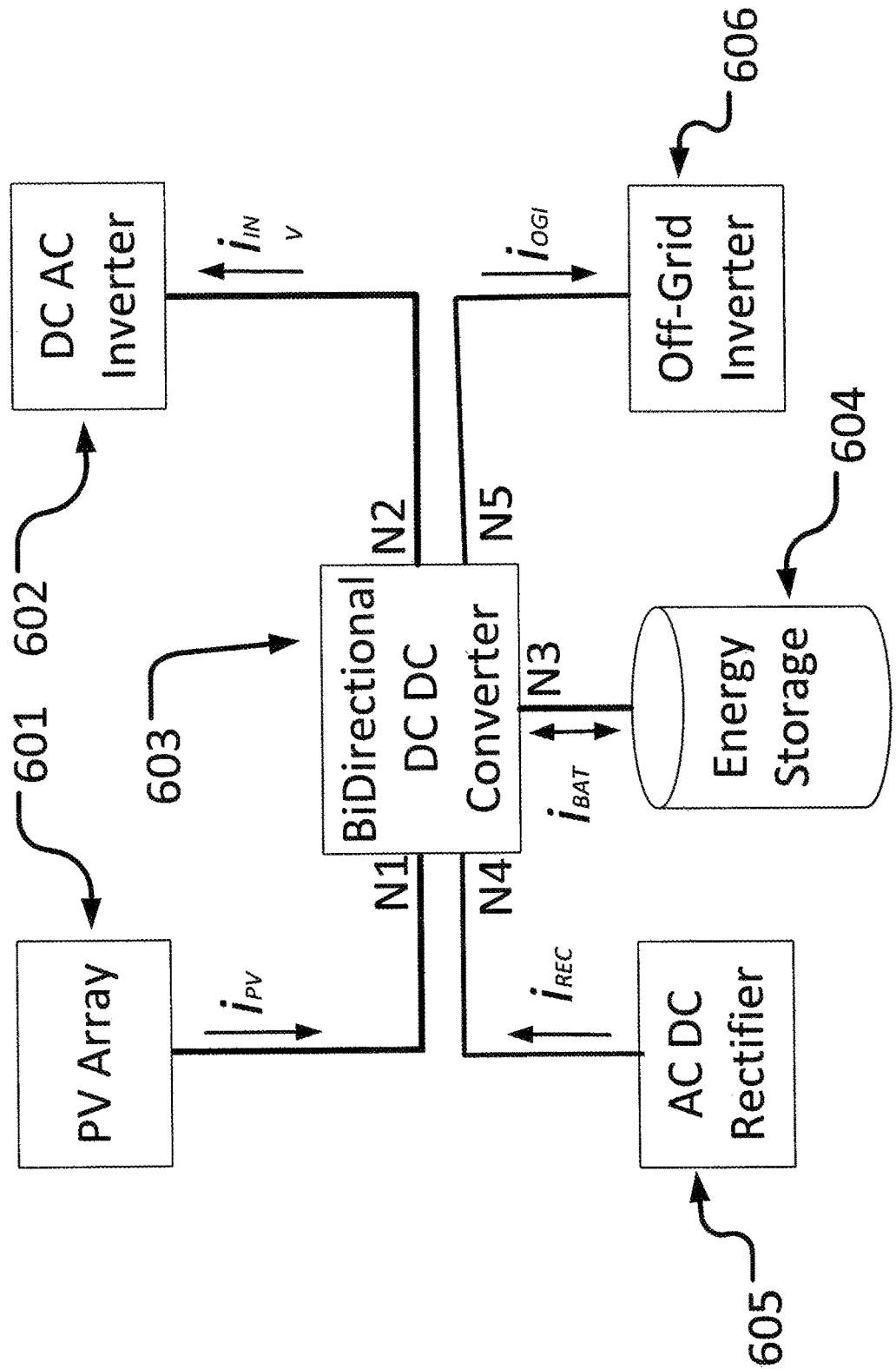
FIG. 5 is a block diagram showing an installation configuration of a further embodiment with respect to a PV array of a solar energy system, an energy storage system, a grid-tied DC AC inverter, an AC DC rectifier and an off-grid inverter.

FIG. 5 is a block diagram showing an installation configuration of a further embodiment (bidirectional DC DC converter 603, also referred to below as DC DC converter 603) with respect to a PV array (PV array 601) of a solar energy system, an energy storage system (energy storage system 604), a grid-tied DC AC inverter (DC AC inverter 602), an AC DC rectifier (AC DC rectifier 605) and an off-grid inverter (off-grid inverter 606). As shown in FIG. 5, auxiliary DC power from AC DC rectifier 605 is applied as input to terminal N4 of DC DC converter 603. In accordance with one or more such embodiments, AC DC rectifier 605 is connected to an AC power source such as, for example and without limitation, a generator, a wind turbine, or a utility grid. AC DC rectifier 605 may be used to provide power and energy when PV array 601 is absent or not operating and energy storage system 604 needs to be charged. In accordance with one or more such embodiments, DC output from AC DC rectifier 605 is configured to match a primary side voltage of DC DC converter 603. As further shown in FIG. 5, auxiliary, off-grid DC AC inverter 606 is connected to terminal N5 of DC DC converter 603, for example and without limitation, to provide a "critical load" power supply whether the utility grid is present or not. As described above, at times when the utility grid is not functioning, DC AC inverter 602 is required to shut down. Off-grid DC AC inverter 606 could be connected directly to loads that a customer decides are critical, such as, for example and without limitation, emergency lighting, refrigeration, etc., without back feeding power to the utility grid. As such, auxiliary, off-grid DC AC inverter 606 can be supplied by either the high voltage on the primary side (high voltage side) of bidirectional DC DC converter 603 or the secondary side (low voltage side) of bidirectional DC DC converter 603. Most readily available off-grid inverters are designed to work directly with low voltage energy storage systems.

Further alternative embodiments of installations of an energy source (for example, photovoltaic (PV) array of solar energy system 101), an energy storage system (for example, energy storage system 104), and a grid-tied DC AC inverter (for example, grid-tied DC AC inverter 102) can be fabricated wherein bidirectional DC DC converter 103 shown in FIG. 3 is replaced by alternative embodiments of a bidirectional DC DC converter that are described below. As such, FIG. 1 would be modified by substituting a bidirectional DC DC converter (as described below) for bidirectional DC DC converter 103 and FIG. 2 would remain the same. Despite the use of the alternative embodiments of bidirectional DC DC converter 103, the operation of the further embodiments of the installations, with respect to adjusting the impedance of the bidirectional DC DC converter to achieve the above-described behavior, will be essentially the same as that of the embodiments described above.

As is known in the prior art, one class of commercially available bidirectional DC DC converters has the ability to adjust voltage and current by varying the duty cycle of a switching signal whereas another class of commercially available bidirectional DC DC converters has the ability to vary voltage and current by varying the frequency of a switched signal. In accordance with one or more such further alternative embodiments, any type of bidirectional DC DC converter that allows input control signals to adjust the bidirectional voltage and current will be suitable for use in fabricating such further alternative embodiments. Such controllable bidirectional DC DC converters typically allow adjustment of voltage and current output by means of a control voltage input signal or a digital input signal from a controller.

Typical controllable bidirectional DC DC converters allow adjustments in terms of voltage and current. However, since impedance=voltage/current, the impedance of the bidirectional DC DC converter can be controlled using control signals to control voltage and current in accordance with this rule. In other words, the controller will calculate the required impedance and then cause the voltage and current to change as required to achieve the required impedance.

Since the further alternative embodiments include voltage and current sensors at nodes N1, N2 and N3 (see FIG. 2), in the same manner as described above, the currents flowing into nodes N1 and N2, along with the node voltages, are used by the controller (which is executing the business rules per FIGS. 6A and 6B) to calculate the desired impedance. The controller uses the calculated impedance to adjust the voltage and current of the converter by means of the control inputs of the converter.

An example of a suitable, commercially available, bidirectional DC DC converter is the model EZA2500-32048 bidirectional DC DC converter available from TDK Lambda Americas Inc., having corporate headquarters at 401 Miles of Cars Way, Suite 325, National City, Calif. 91950. The TDK bidirectional DC DC converter allows control of voltage and current through a digital control interface.

Another example of a suitable, commercially available, bidirectional DC DC converter is the BRUSA model BSC 618 bidirectional DC DC converter available from Brusa Elecktronik AG, Neudorf 14, Postfach 55, 9466 Sennwald, Schweiz. The Brusa bidirectional DC DC converter has a controllable frequency topology bidirectional converter that is controllable by commands through a digital interface.

Embodiments of the present invention described above are exemplary, and many changes and modifications may be made to the description set forth above by those of ordinary skill in the art while remaining within the scope of the invention. For example, although embodiments were described in the context of solar energy systems, embodiments of the present invention are not restricted thereto and include, for example, and without limitation, a whole range of energy source systems such as wind generation energy systems. Thus, the disclosure of the invention is intended to be illustrative, but not limiting, of the scope of the invention. As such, the scope of the invention should be determined with reference to the appended claims along with their full scope of equivalents.

What is claimed is:

1. A bidirectional DC DC converter comprising a first section that is magnetically coupled by a transformer to a second section;
wherein:
the first section comprises a half bridge switching network that is connected to a primary winding of the transformer;
the second section comprises an inductor, a capacitor, and a third and a fourth controller operable switch; wherein (a) a first end of the third switch is connected to a first end of a first secondary winding of the transformer; (b) a second end of the first secondary winding of the transformer is connected to a first end of the second secondary winding of the transformer and a first end of the inductor; (c) a second end of the inductor is connected to a first end of the capacitor; (d) a second end of the second secondary winding of the transformer is connected to a first end of the fourth switch; and (e) a second end of the third switch is connected to a second end of the fourth switch and a second end of the capacitor;
the half bridge switching network comprises a voltage divider connected through a first and a second controller operable switch to the primary winding; and
the voltage divider comprises a first and second diode, a first and second resistor, and a first and second capacitor wherein: (a) a first end of the first diode, a first end of the first resistor, and a first end of the first capacitor are connected at a first end of the voltage divider; (b) a second end of the first diode, a first end of the second diode, a second end of the first resistor, a first end of the second resistor, a second end of the first capacitor, and a first end of the second capacitor are connected at a middle of the voltage divider; and (c) a second end of the second diode, a second end of the second resistor, and a second end of the second capacitor are connected at a second end of the voltage divider.

2. The bidirectional DC DC converter of claim 1 wherein:
the first end of the voltage divider is connected to a first end of the first switch;
a second end of the first switch is connected to a first end of a primary winding of the transformer and to a first end of the second switch;
a second end of the primary winding is connected to the middle of the voltage divider; and
a second end of the second switch is connected to the second end of the voltage divider.

3. The bidirectional DC DC converter of claim 2 wherein the first, second, third, and fourth switches are Silicon Carbide (SiC) transistors or Gallium Nitride (GaN) transistor devices.

4. An apparatus that: (a) receives power output from a power source and delivers at least a part of the power output to an energy storage system and/or at least a part of the power output to an energy usage system and (b) receives power stored in the energy storage system and delivers the stored power to the energy usage system, the apparatus comprising:
a controller, in response to business rules, that controls: (a) times and amounts of the power output delivered to the energy usage system; (b) times and amounts of the power output delivered for storage in the energy storage system; and (c) times and amounts of power output from the energy storage system delivered to the energy usage system;

the bidirectional DC DC converter of claim 2 wherein the power source and the energy usage system are connected to the first section and the energy storage system is connected to the second section; and current and voltage sensors that transmit voltage and current measurements from the power source, the energy usage system, and the energy storage system to the controller.

5. The apparatus of claim 4 wherein the controller is adapted to cause the apparatus to operate in a charge mode wherein power is transferred to the energy storage system by causing the first and second switches to be operated 180 degrees out of phase to each other to generate an AC signal across the terminals of the primary winding and by causing synchronous switching of the third and fourth switches so that the first and second secondary windings are alternately discharged.

6. The apparatus of claim 4 wherein the wherein the controller is adapted to cause the apparatus to operate in a discharge mode wherein power is transferred from the energy storage system to the energy use system by causing: the first and second switches to be off so they act as diodes, and by causing (a) both the third and fourth switches to be on for a first time period; (b) then the third switch to be on and the fourth switch to be off for a second time period; (c) then both the third and fourth switches to be on for a third period, and (d) then the third switch to be off and the fourth switch to be on for a fourth period.

7. The apparatus of claim 4 wherein the controller is adapted to cause the apparatus to operate so that all the power output by the power source flows to the energy usage system by causing the first, the second, the third, and the fourth switches to be off.

8. The apparatus of claim 4 wherein the controller is adapted to be connected to a data communications port to provide a user interface to receive business rules.

9. The apparatus of claim 4 wherein the controller is adapted to be connected to receive data from the energy storage system.

* * * * *